(12) United States Patent
Khoroshev

(10) Patent No.: US 11,040,681 B2
(45) Date of Patent: Jun. 22, 2021

(54) VEHICLE PERIPHERY DEVICE

(71) Applicant: Alexey Fedorovich Khoroshev, Moscow (RU)

(72) Inventor: Alexey Fedorovich Khoroshev, Moscow (RU)

( * ) Notice: Subject to any disclaimer, the term of this patent is extended or adjusted under 35 U.S.C. 154(b) by 0 days.

(21) Appl. No.: 16/070,854

(22) PCT Filed: Dec. 15, 2016

(86) PCT No.: PCT/RU2016/000890
§ 371 (c)(1),
(2) Date: Jul. 18, 2018

(87) PCT Pub. No.: WO2017/131552
PCT Pub. Date: Aug. 3, 2017

(65) Prior Publication Data
US 2019/0031128 A1  Jan. 31, 2019

(30) Foreign Application Priority Data

Jan. 29, 2016 (RU) .......................... RU2016103017

(51) Int. Cl.
*B60R 19/42* (2006.01)
*B62D 39/00* (2006.01)
*B60R 19/16* (2006.01)

(52) U.S. Cl.
CPC .............. *B60R 19/42* (2013.01); *B62D 39/00* (2013.01); *B60R 19/16* (2013.01)

(58) Field of Classification Search
CPC .......... B60R 19/42; B60R 39/00; B60R 19/16
See application file for complete search history.

(56) References Cited

U.S. PATENT DOCUMENTS

| | | | | |
|---|---|---|---|---|
| 451,128 | A | * 4/1891 | Lawson | A61H 3/00 108/50.16 |
| 1,341,219 | A | * 5/1920 | Ridgway | A63G 25/00 472/28 |
| 2,439,974 | A | * 4/1948 | Holman | H02G 11/02 191/12 R |
| 3,145,048 | A | * 8/1964 | Dowdy | A47D 13/043 297/5 |

(Continued)

FOREIGN PATENT DOCUMENTS

| | | |
|---|---|---|
| DE | 2321439 A1 | 11/1973 |
| DE | 3527192 A1 | 2/1987 |
| RU | 136783 U1 | 1/2014 |

*Primary Examiner* — Lori L Lyjak

(57) ABSTRACT

Vehicle periphery device implemented in a form whose external outline of its projection onto the horizontal plane of the bearing surface has the form of a circle, with this periphery capable of passing between possible points of contact of this periphery located at a distance equal to the diameter of this circle. Technical result: prevention of periphery jamming; ensuring ideal Internet compatibility, optimality for any positioning, optimality for any digital technology; saved space; increased density of the traffic; implementation of the purpose. It should help fundamentally more quickly and efficiently: implement fully automatic control of individual vehicles, combine their operation into a fully automated transport system in which modified vehicles can completely replace motor cars and, where possible, other modes of transport.

1 Claim, 3 Drawing Sheets

(56) References Cited

U.S. PATENT DOCUMENTS

| | | | | |
|---|---|---|---|---|
| 3,164,391 | A * | 1/1965 | Don O'Neal | B62M 5/00 280/1.12 |
| 3,796,430 | A * | 3/1974 | Sudo | A47D 13/043 280/87.05 |
| 3,938,828 | A * | 2/1976 | Hammond | B62J 27/00 280/261 |
| 4,045,045 | A * | 8/1977 | Boucher | A47D 13/043 280/87.051 |
| 4,231,582 | A * | 11/1980 | Moss | A47D 13/043 280/650 |
| 4,237,990 | A * | 12/1980 | La | B60B 19/003 180/7.1 |
| 4,324,301 | A * | 4/1982 | Eyerly | A63G 25/00 104/53 |
| 4,364,576 | A * | 12/1982 | Kassai | A47D 13/043 280/87.05 |
| 4,480,846 | A * | 11/1984 | Sanchez | A47D 13/043 188/174 |
| 4,640,527 | A * | 2/1987 | Taylor | B60R 19/42 280/756 |
| 4,861,301 | A * | 8/1989 | Pomeroy | B63B 35/76 441/131 |
| 4,971,314 | A * | 11/1990 | Barber | A63G 25/00 104/69 |
| 4,988,138 | A * | 1/1991 | Danna | A47D 13/043 280/87.051 |
| 5,302,163 | A * | 4/1994 | Fermaglich | A47D 13/043 297/137 |
| 5,727,800 | A * | 3/1998 | Liu | A47D 13/043 188/5 |
| 5,989,126 | A * | 11/1999 | Kilbert | B63B 35/76 104/70 |
| 5,997,017 | A * | 12/1999 | Tilley | B62M 1/00 280/200 |
| 5,997,059 | A | 12/1999 | Thomas | |
| 6,796,398 | B1 * | 9/2004 | DeGevay | B62D 31/003 180/21 |
| 7,594,667 | B2 * | 9/2009 | Overland | B62B 3/16 16/110.1 |
| 8,162,333 | B1 * | 4/2012 | Bartlett | A47D 13/043 280/87.05 |
| 8,851,558 | B2 * | 10/2014 | Asaga | B62D 25/00 296/203.01 |
| 9,126,614 | B2 * | 9/2015 | Lorenzo Rodriguez | B62B 3/14 |
| 9,144,324 | B1 * | 9/2015 | Champagne | A47D 13/043 |
| D784,852 | S * | 4/2017 | Gong | D12/1 |
| 9,924,807 | B1 * | 3/2018 | Richter | A47D 13/043 |
| 10,053,164 | B2 * | 8/2018 | Faruque | B60N 2/3047 |
| 2002/0105155 | A1 * | 8/2002 | Hou | B62B 9/24 280/47.4 |
| 2002/0164917 | A1 * | 11/2002 | Keegan | A47D 13/107 446/71 |
| 2007/0209851 | A1 * | 9/2007 | Sweringen | A63G 25/00 180/65.51 |
| 2007/0236056 | A1 * | 10/2007 | Steininger | A47D 3/001 297/136 |
| 2009/0267313 | A1 * | 10/2009 | Kalajyan | B62B 5/0083 280/33.998 |
| 2010/0147609 | A1 * | 6/2010 | Gorgas | A63G 25/00 180/65.51 |
| 2010/0173717 | A1 * | 7/2010 | Yule | A63G 21/18 472/128 |
| 2011/0111871 | A1 * | 5/2011 | Legary | A63G 31/007 472/128 |
| 2011/0218047 | A1 * | 9/2011 | Kessler | B60K 1/00 472/89 |
| 2013/0001916 | A1 * | 1/2013 | Orenstein | A63C 17/0026 280/200 |
| 2013/0111670 | A1 * | 5/2013 | Ali | A47D 13/043 5/655 |
| 2015/0126085 | A1 * | 5/2015 | Swierkocki | B63C 9/04 441/41 |

* cited by examiner

VEHICLE PERIPHERY DEVICE

TECHNICAL FIELD OF INVENTION

The primary application of the field of invention "Vehicle periphery device" (hereinafter also referred to as the "Invention") is carriage facilities.

PRIOR ART

One knows well devices in vehicles whose efficiency of contact with the environment insofar as it concerns minimization of the bearing surface area necessary for movement and staying motionless is achieved by giving the vehicle an increasingly rounded shape which, as a result of this, in some vehicles is such that their external outline projection onto the horizontal plane of the bearing surface has the form of a circle, but as a device, i.e., a product of human activity whose elements make a constructive unity and are functionally interrelated, the periphery (from the Greek peripheria, a circle), i.e., the round-shaped exterior edge of a vehicle is not described by the prior art. Hence, the Invention has no analogs.

INVENTION DESCRIPTION

The Invention resolves the task of increasing the convenience of using the vehicle and the task of expanding the range of technical facilities designed as vehicles, which will be explained below, indicating the technical results provided by the Invention.

The essence of the Invention as a technical solution consists in the below totality of essential characteristics, which is sufficient to achieve the technical result provided by the Invention:

vehicle periphery device implemented in a form whose external outline of its projection onto the horizontal plane of the bearing surface has the form of a circle with this periphery capable of passing between possible points of contact of this periphery located at a distance equal to the diameter of this circle.

The above-mentioned Invention achieves the following technical results:

prevent jamming of the vehicle periphery whose external outline of its projection onto the horizontal plane of the bearing surface has the form of a circle between possible points of contact of this periphery located at a distance equal to the diameter of this circle, hence the convenience of using the vehicle is better;

enable vehicle data calculation by calculating the data of a single point that is the center of symmetry of the vehicle periphery admitting of contact, which ensures ideal Internet compatibility of the vehicle, optimality for any positioning, optimality for any digital technology, hence the convenience of using the vehicle is better;

save space necessary for vehicle operation by enabling points of possible contact with the vehicle periphery to make free space for the passage of vehicle periphery with the section of the minimum possible outline width of the vehicle periphery equal to the diameter of the circle formed by the projection of the vehicle periphery onto the horizontal plane of the bearing surface, for vehicle movement in these spaces, hence the convenience of using the vehicle is better;

increase the density of the traffic flow by ensuring the most efficient and minimal area of possible traffic flow with no intervals between the vehicles, i.e., where the vehicles touch each other on the surface of the contact-admitting periphery whose external outline of its projection onto the horizontal plane of the bearing surface has the form of a circle, due to changes in the relative positions of the vehicles forming the traffic flow, which changes follow the bends and unevenness of the road, and changes in the configuration of the flow, due to the fact that the design of vehicles in the traffic have the Invention design making it possible for the periphery of the vehicle, which is forced by the unevenness and/or bends of the road to change its position between other vehicles contacting with this vehicle, to pass between the potential points of contact of the periphery located at a distance equal to the diameter of the circle formed by the projection of this vehicle periphery onto the horizontal plane of the bearing surface, hence the convenience the vehicle is better;

implement the purpose of the vehicle which can be modified by means of the vehicle periphery device claimed by the Invention in combination with the already available devices which are not known from prior art and not explicitly following from prior art to a specialist, hence the range of technical facilities designed as vehicles is expanding.

The claimed Invention ensures the above technical results and should help, essentially more quickly and efficiently, to introduce fully automated control of individual vehicles, merge their operation into a fully automated transport system where vehicles modified by means of the Invention can completely replace motor-cars and, where possible, other modes of transport.

INVENTION IMPLEMENTATION

The Invention will be described in detail below. It should be noted that the Invention implementation options described below do not limit the Invention. In addition, the below constituent elements of the Invention implementation varieties include elements that can easily be conceived by an ordinary specialist in the relevant field of engineering or elements that are essentially the same as elements that can easily be conceived by an ordinary specialist in the relevant field of engineering.

Figure 1:
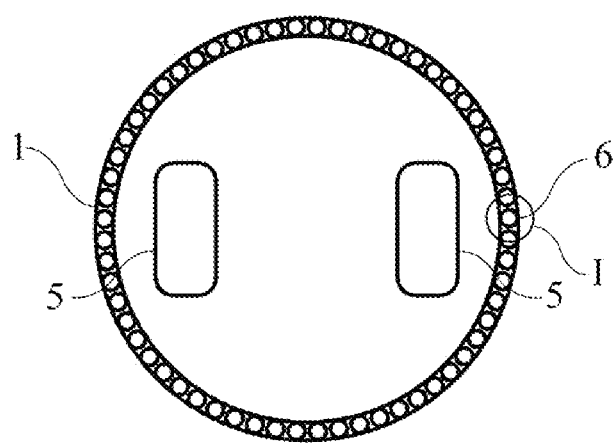
FIG. 1 schematically illustrates, by way of example, the implementation of vehicle periphery device in a form whose external outline of its projection onto the horizontal plane of the bearing surface has the form of a circle.
Figure 2:
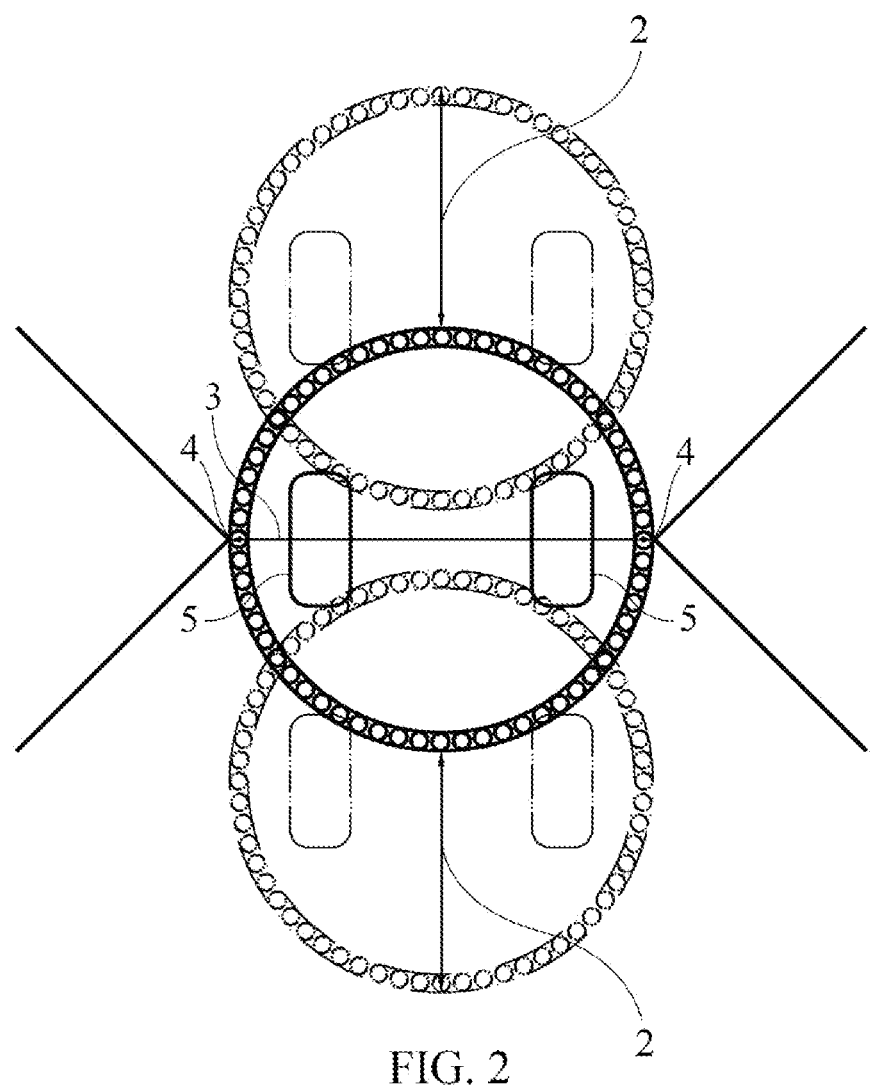
FIG. 2 schematically illustrates, by way of example, the capability of vehicle periphery device implemented in a form whose external outline of its projection onto the horizontal plane of the bearing surface has the form of a circle to pass between possible points of contact of this periphery located at a distance equal to the diameter of this circle.
Figure 3:
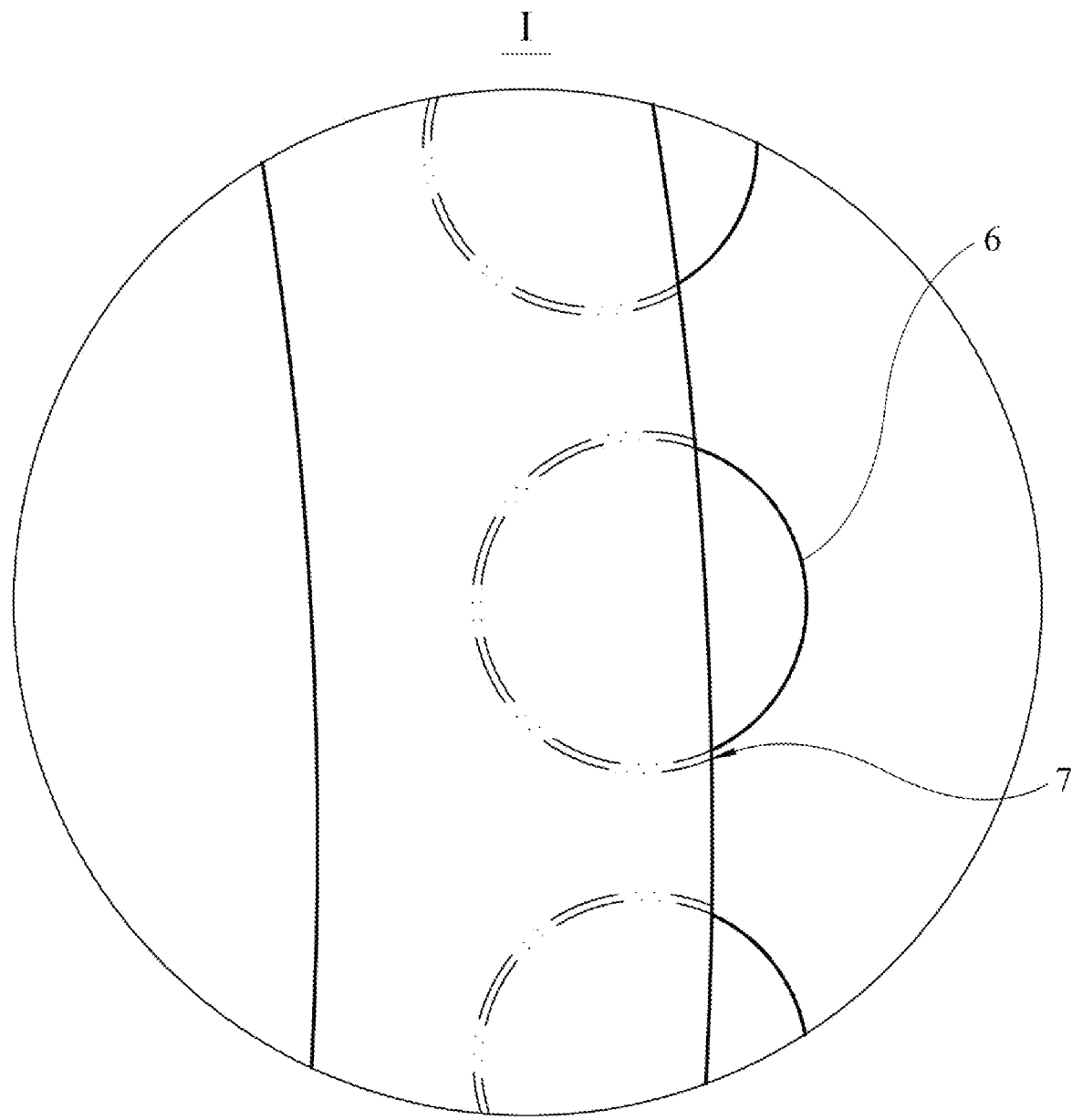
FIG. 3 schematically illustrates, by way of example, the details of the spherical elements in the holding pockets (I from FIG. 1)
Figure 4A:
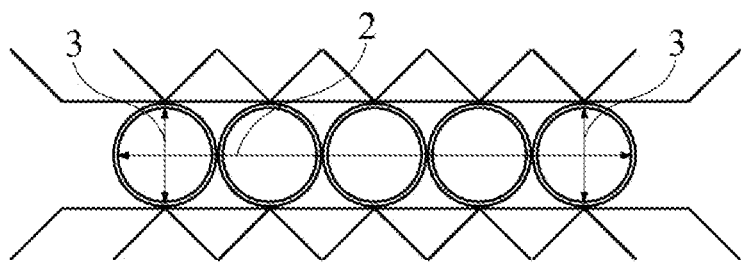
FIG. 4A schematically illustrates, by way of example, the variation of the movement of the vehicle along such a straight corridor—with constant contact with its walls located at a distance equal to the diameter of such vehicle.
Figure 4B:
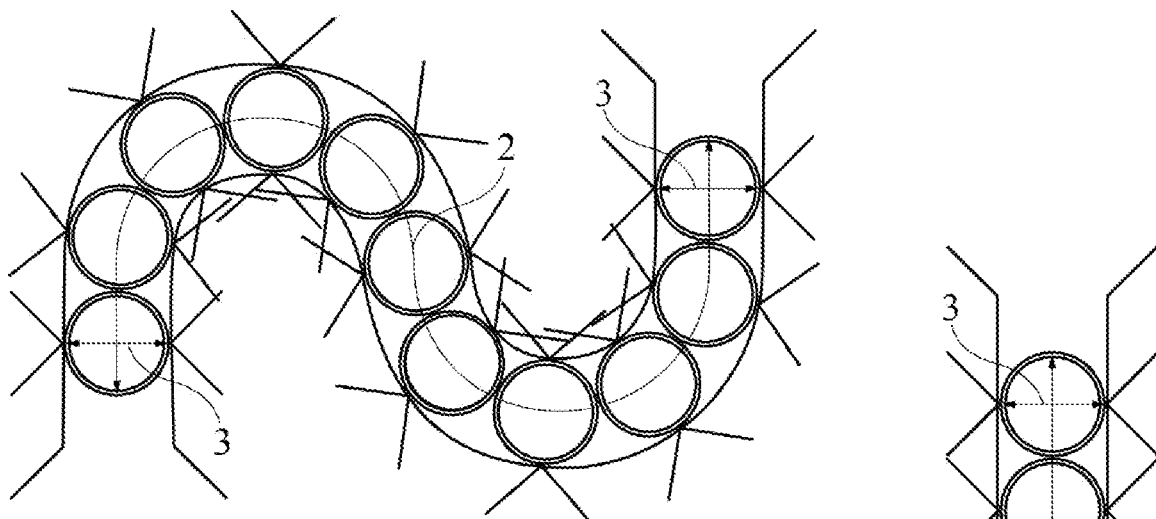
FIG. 4B schematically illustrates, by way of example, the variation of the movement of the vehicle along such an s-shaped corridor—with constant contact with its walls located at a distance equal to the diameter of such vehicle.
Figure 4C:
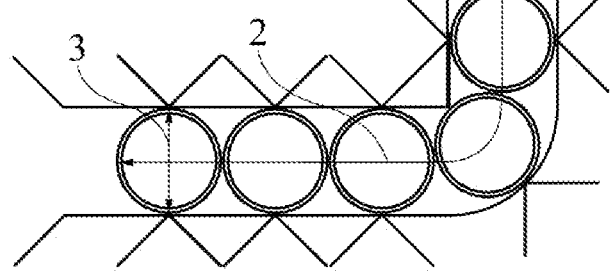
FIG. 4C schematically illustrates, by way of example, the variation of the movement of the vehicle along such a corridor, one wall of which forms a straight angle—with constant contact with its walls, including a wall that forms a right angle, located at a distance equal to the diameter of such vehicle.
Figure 4D:
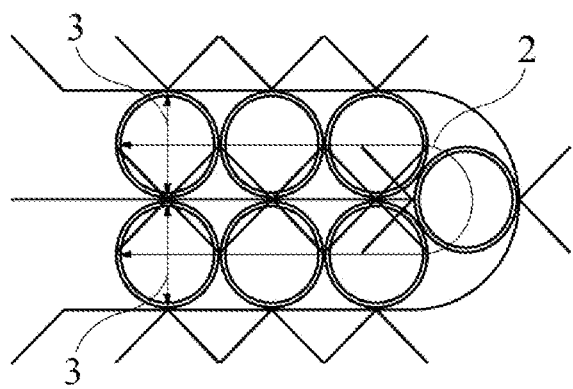
FIG. 4D schematically illustrates, by way of example, the variation of the movement of the vehicle along such a corridor, one wall of which forms a zero angle—with constant contact with its walls, including a wall that forms a zero angle lie. turning 180° strictly around one point) located at a distance egual to the diameter of such vehicle.

The Invention can be implemented, for example, as a vehicle periphery device 1 having a shape where the external outline of its projection on the horizontal plane of the bearing surface has the form of a circle (FIG. 1), with this periphery 1 capable of passing 2 between potential points of contact 4 of this periphery located at a distance equal to the diameter 3 of this circle (FIG. 2). It should be noted that the capability of this vehicle periphery 1 whose projection of the external outline onto the horizontal plane of the bearing surface makes a circle to pass 2 between possible points of contact 4 of this periphery located at a distance equal to the diameter 3 of this circle, i.e. the diameter of the vehicle, effectively means maximum freedom of mobility of the vehicle periphery 1 with respect to the most diverse objects with which the vehicle periphery 1 can come into contact during normal vehicle operation if there is no contact, of course, or if there is one point of contact or if there are several points of contact and the distance between any or some of them is less than the vehicle diameter or if, certainly, the distance between the contact points equals the vehicle diameter while such contact points can occur and be situated in one or more than one plane. Therefore, where a vehicle has a periphery whose external outline of its projection onto the horizontal plane of the bearing surface has the form of a circle, with this periphery capable of passing between possible points of its contact located at a distance equal to the diameter of this circle, to avoid any processes complicating normal operation of the vehicle, significantly impeding the movement, not resulting from the intentionally designed capability of this vehicle periphery to pass freely, i.e., without significant additional effort, between the possible points of contact of this periphery, located at a distance equal to the diameter of this circle, this Invention provides, for example, for such a design of this vehicle periphery in which the external outline of the periphery surface, which can be contacted during normal operation, is always shaped as a circle or a respective part thereof, with the diameter equal to the diameter of this circle whose shape is formed by the projection of the vehicle periphery onto the horizontal plane of the bearing surface, in any of the planes intersecting a point equidistant from each of the two below-mentioned motor-wheels (hereinafter also referred to as the "center of symmetry of the vehicle periphery") on the line passing through the axes of rotation of two such electric motor-wheels 5 located symmetrically in relation to the axis of symmetry of the vehicle periphery in which changes in the rotation characteristics ensure mobility and controllability of the vehicle; the Invention characterized by the shape of the device as a whole, with the periphery having a form whose external outline projection onto the horizontal plane of the bearing surface has the form of a circle, and the general concept presented at the level of functional generalization, with this periphery capable of passing between its possible points of contact located at a distance equal to the diameter of this circle, can be realized, for example, by arranging this vehicle periphery through placement, at the same distance from the above point identified on the line passing through the axes of the above motor-wheels, ensuring (in compliance with the existing vehicle width restrictions for an overwhelming majority of roads, not more than 2.55 m) a certain diameter of the corresponding spherical surface of the vehicle periphery limited, for example, in a normal vertical position of the vehicle above the bearing surface vertically in the interval from the minimum ground clearance, which, for example, is currently about 0.1-0.2 m, up to the maximum acceptable step height for passengers, which at present, for example, should be taken in the range of about 0.2-0.3 m, of contacting spherical elements having dimensions permitting them, in view of all the above conditions, to be used to make the vehicle periphery in such a way that the points of those elements which are the farthest from the symmetry point of the corresponding surface in the vehicle periphery form the above diameter of the corresponding part of the spherical surface whose circular projection shape is to be found in the external outline of the vehicle periphery projection onto the horizontal plane of the bearing surface, enabling the passage of the vehicle periphery between points of possible contact, for which purpose the spherical elements 6 can be placed in horizontal circular rows vertically filling the entire bearing surface on the bearing surface forming a spherical base at an equal distance from the center of symmetry of the vehicle periphery, having linear dimensions corresponding to the above linear dimensions of the spherical elements location and the spherical elements themselves held on the bearing surface by parts corresponding to the shape of gaps between the spherical elements and not impeding the passage. The above-mentioned vehicle periphery is made of shock-resistant, wear-resistant, shock-absorbing, good-for-sliding, non-corrosive materials, creating, with the respective above-mentioned parts, which are as distant from the above center of symmetry of the vehicle periphery as possible, of the elements 6 forming a perimeter encircling the vehicle, ensuring normal operation of the vehicle and protecting the vehicle against damage in case of contact with other objects, a perimeter whose above-specified design forming the periphery should provide maximum freedom of mobility of the vehicle periphery with respect to the most diverse objects that the vehicle periphery can contact with in the course of its normal operation, if, of course, there is no contact or if there is one contact point or if there are several contact points and the distance between any or some points of contact is less than the vehicle diameter, or if, of course, the distance between the contact points is equal to the vehicle diameter and such contact points can occur not only in the same plane. This design of the vehicle periphery ensures perfect Internet compatibility of the vehicle, optimal, for any positioning and any digital technology, possibility to calculate the data of each vehicle by calculating the data of one point which is the center of symmetry of the vehicle periphery admitting of contact, which is further optimized by the definiteness of spatial volumes with a cross section of the minimum possible width of the outline of the vehicle periphery admitting of contact, which width is equal to the diameter of the circle whose form is made by the vehicle periphery projection onto the horizontal plane of the bearing surface, for movement in these spatial volumes.

If necessary, the presentation of the above-mentioned implementation of the claimed Invention should be seen at least as a presentation of the best of the applicants contemplated modes of the claimed Invention.

Another version of the vehicle periphery design is possible, too, in which, for example, the periphery is formed by freely rotating spherical elements 6 located along the perimeter in the respective holding pockets 7 allowing free rotation, where such elements allow the external surface of this periphery to pass, essentially slipping with a circle-making outline at the point of contact with anything, as a result of which the Invention can be implemented in the above construction forming a circular outline of the external surface of the vehicle periphery formed by the constituent parts of spherical elements 6, the most distant from the center of symmetry of the vehicle periphery, which elements freely rotate in pockets 7 holding such elements 6 in their position and having a shape corresponding to the freely rotating elements 6 in them, leaving, as open as possible so that the element does not fall out, the corresponding part of such a spherical element 6 which is opposite to the other part facing the center of symmetry of the vehicle periphery. Given the above, the aforementioned spherical elements 6 should be located at the same distance from the above-mentioned center of symmetry of the vehicle periphery, have such dimensions, be installed in such quantities, on such surface and with such density determined to make sure that their parts located at a maximum distance from this center of symmetry of the vehicle periphery form the respective external surface of the vehicle periphery, as smooth as possible, which surface, due to free rotation of the spherical elements 6 whose respective points make the spherical basis of its circular outline with a diameter equal to the diameter of the circle, the shape of which is the shape of the external outline of the projection of the above-mentioned vehicle periphery on the horizontal plane of the bearing surface, enables the outline of that surface to pass, essentially sort of slip relative to the contact points of objects contacting this surface, providing, in case of contact, which should also be understood as contact, during the process of such slipping, along the outline of the aforementioned spherical surface of the vehicle periphery, functionally possible, corresponding, without significant additional shearing forces or other displacement or the like, any mutual displacements, similar to the aforementioned slipping, of the vehicle periphery at the point(s) of contact with anything contacting the vehicle periphery, along the respective surface on which the contact remains during such displacement. For the best performance of the said functions, all components in the design of the aforementioned vehicle periphery should be made of shock-resistant, wear-resistant, shock energy absorbing materials that are non-corrosive and good for sliding.

The above-mentioned information undoubtedly confirms that the aforementioned and any other devices implementing the invented design of this vehicle periphery implement the purpose of this periphery as "vehicle periphery", with a set of essential features, one of which is characterized by the form of the device as a whole: the periphery in the form whose external outline projection onto the horizontal plane of the bearing surface has the form of a circle, and the second one a general concept represented at the level of functional generalization: with the possibility of this periphery passage between possible points of contact of this periphery located at a distance equal to the diameter of this circle, which certainly improves the vehicle usability; it is also confirmed that invention implementation can produce the below technical results:

prevent jamming of the vehicle periphery whose external outline of its projection onto the horizontal plane of the bearing surface has the form of a circle, between the possible points of contact of this periphery located at a distance equal to the diameter of this circle;

enable vehicle data calculation by calculating the data of one point which is the center of symmetry of the vehicle periphery admitting of contact, which ensures ideal Internet compatibility of the vehicle, optimality for any positioning, optimality for any digital technologies;

save space necessary for vehicle operation by enabling points of possible contact with the vehicle periphery to make free space for the passage of vehicle periphery with the section of the minimum possible outline width of the vehicle periphery equal to the diameter of the circle formed by the projection of the vehicle periphery onto the horizontal plane of the bearing surface, for vehicle movement in these spaces;

increase the density of the traffic flow by ensuring the most efficient and minimal area of possible traffic flow with no intervals between the vehicles, i.e., where the vehicles touch each other on the surface of the contact-admitting periphery whose external outline of its projection onto the horizontal plane of the bearing surface has the form of a circle, due to changes in the relative positions of the vehicles forming the traffic flow, which changes follow the bends and unevenness of the road, and changes in the configuration of the flow, due to the fact that the design of vehicles in the traffic have the Invention design making it possible for the periphery of the vehicle, which is forced by the unevenness and/or bends of the road to change its position between other vehicles contacting with this vehicle, to pass between the possible points of contact of the periphery located at a distance equal to the diameter of the circle formed by the projection of this vehicle periphery onto the horizontal plane of the bearing surface.

The above information undoubtedly confirms, too, that the above-mentioned and any other vehicle periphery designs implementing the Invention implement the purpose of this periphery specified as "vehicle periphery", enable, in implementing the Invention, a technical result consisting in the implementation of the vehicle purpose, since the above-said and any other structures implement the purpose of its periphery, with a set of essential features, one of which is characterized by the form of the device as a whole: the periphery in the form whose external outline of its projection onto the horizontal plane of the bearing surface has the form of a circle, and the second one a general concept represented at the level of functional generalization: with this periphery capable of passing between possible points of contact of this periphery located at a distance equal to the diameter of this circle, certainly ensure vehicle modification, in conjunction with existing devices, due to the vehicle periphery device claimed by the Invention, not known by prior art and not expressly following to a specialist from the existing art, which certainly expands the range of technical facilities designed as a vehicle.

Also, the above-mentioned information undoubtedly confirms that the claimed Invention, while it solves the above-mentioned tasks and produces the above-mentioned technical result, in fact helps fundamentally more quickly and efficiently: introduce fully automatic control of individual vehicles, combine their operation into a fully automatic transport system in which vehicles modified by means of the Invention can completely replace motor cars and, where possible, other modes of transport.

Finally, it should also be noted that while the Invention has been described with reference to possible examples of its implementation, one should realize that the Invention is not limited to the potential examples or constructions described above but covers any and all variations within the scope of the Invention claim. It should also be understood that the Invention is intended to cover both various modifications, and equivalent arrangements, and any other uses of the Invention. In addition, it should also be understood that while the various elements of suggested implementations are described in various combinations and configurations that are examples, other combinations and configurations involving a larger or smaller number of elements or only one element may also correspond to the essence and scope of the Invention, for example, in case the vehicle periphery whose external outline of its projection onto the horizontal plane of the bearing surface has the form of a circle is enabled to pass between the possible points of contact of this periphery located at a distance equal to the diameter of this circle, by applying a substance ensuring slipping; or in case the contact-admitting surface of the vehicle periphery whose external outline of its projection onto the horizontal plane of the bearing surface has the form of a circle is manufactured directly from a substance which, too, ensures passage by slipping; or in case of various combinations of such approaches, or anything like that.

INDUSTRIAL APPLICABILITY

It is obvious from the above description and the nature of the invention.

I claim:

1. Vehicle periphery device implemented in a form whose external outline of its, that is previously mentioned vehicle periphery device, projection onto the horizontal plane of the bearing surface has the form of a single circle, which periphery without deformation and hindrance at the moment of such passage can pass between any points of contact of this periphery located at a distance equal to the diameter of this circle, enabling free rotation between such points, that means no deformation and hindrance specifically at the moment of such passage of the periphery of such a vehicle between the points of contact, located at a distance equal to the diameter of the above circle, which form has the above projection of such periphery onto the horizontal plane of the above bearing surface, providing maximum freedom of mobility of such vehicle periphery with respect to the most diverse objects with which such vehicle periphery can come into contact during normal vehicle operation if there is no contact, or if there is one point of contact or if there are several points of contact and the distance between any or some of such points of contact is less than the vehicle diameter or if, the distance between the points of contact equals the vehicle diameter.

* * * * *